United States Patent [19]

Christensen

[11] Patent Number: 5,525,755
[45] Date of Patent: Jun. 11, 1996

[54] REMOVABLE COVER FOR PROTECTING ELECTRICAL COMPONENTS DURING PAINTING OR PLASTERING

[76] Inventor: Arthur E. Christensen, 1316 Dulaney Valley Rd., Towson, Md. 21286

[21] Appl. No.: 311,249

[22] Filed: Sep. 23, 1994

[51] Int. Cl.[6] .................................................. H02G 3/00
[52] U.S. Cl. ............................................ 174/67; 439/135
[58] Field of Search ...................... 174/66, 67; 439/135

[56] References Cited

U.S. PATENT DOCUMENTS

| | | | |
|---|---|---|---|
| 3,619,477 | 11/1971 | Rasmussen | 174/66 |
| 5,003,128 | 3/1991 | Grondin | 174/67 |
| 5,285,014 | 2/1994 | Gilchrist | 174/67 |

Primary Examiner—Kristine L. Kincaid
Assistant Examiner—Michael J. Cornelison
Attorney, Agent, or Firm—Seidel, Gonda, Lavorgna & Monaco

[57] ABSTRACT

A removable cover for shrouding an electrical component from the impingement of dust, plaster, paste or paint during a room surface finishing process, the electrical component being disposed in an electrical junction box mounted within a wall and having apertures formed therein. The removable cover includes a cap member for covering the electrical component when the removable cover is disposed over the electrical component. The removable cover also includes at least one plug member formed on the cap member for coupling the cap member to the electrical component. The plug member is configured so as to be securely disposed within an aperture of the electrical component when the removable cover is disposed over the electrical component.

17 Claims, 4 Drawing Sheets

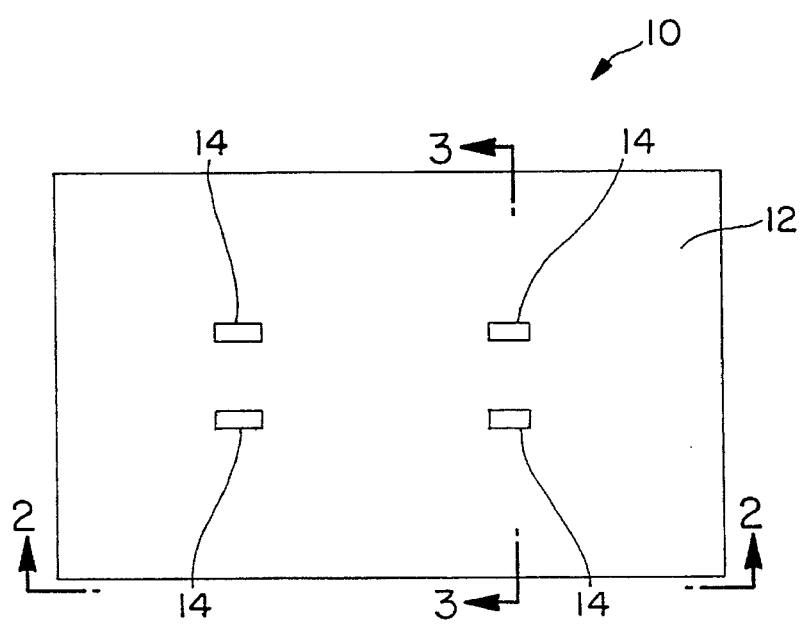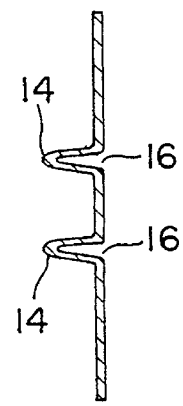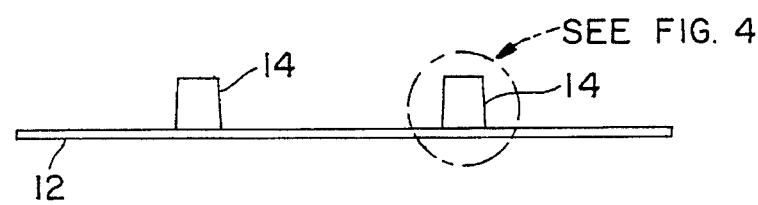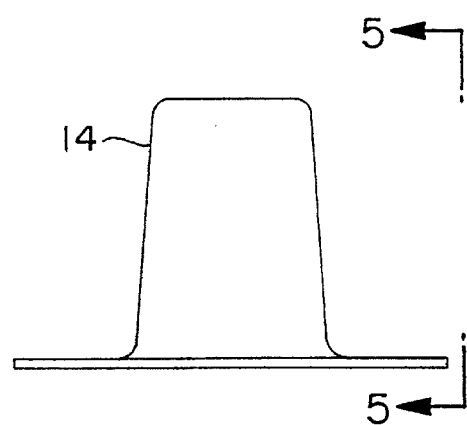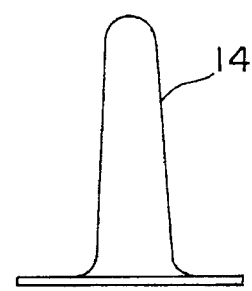

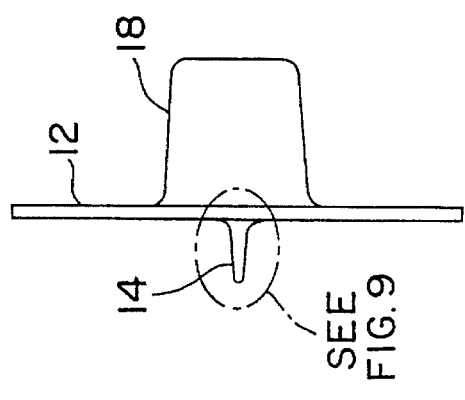
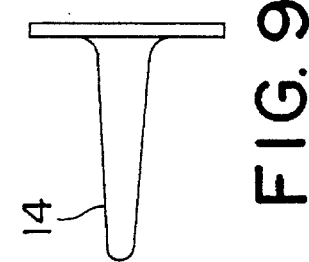
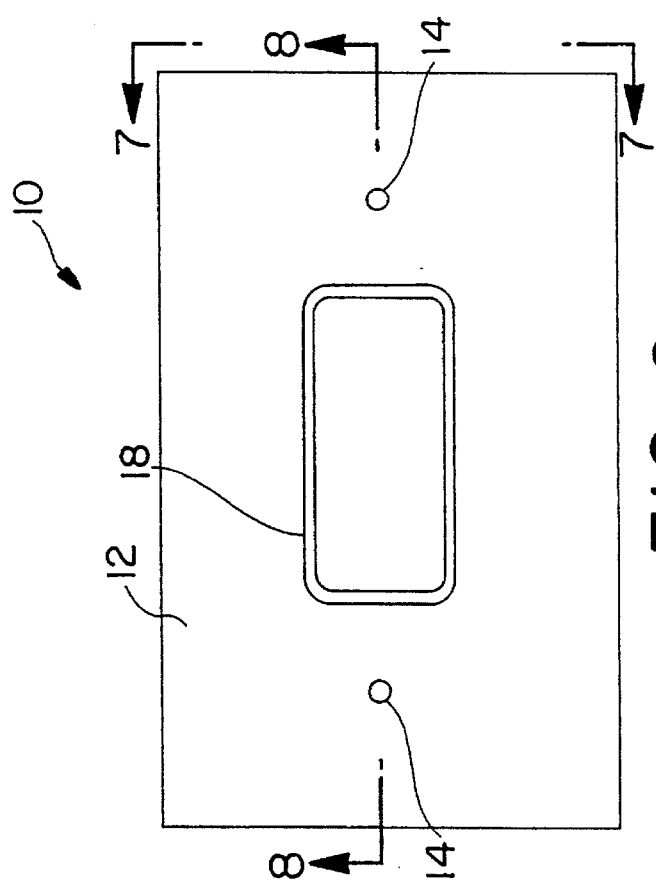
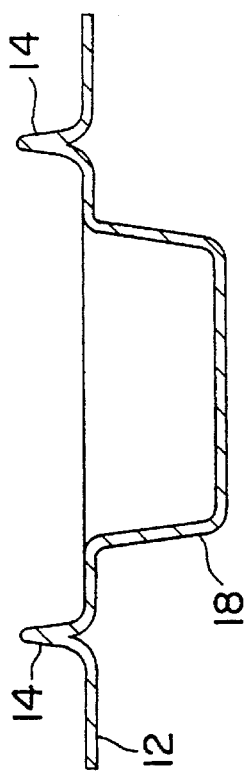

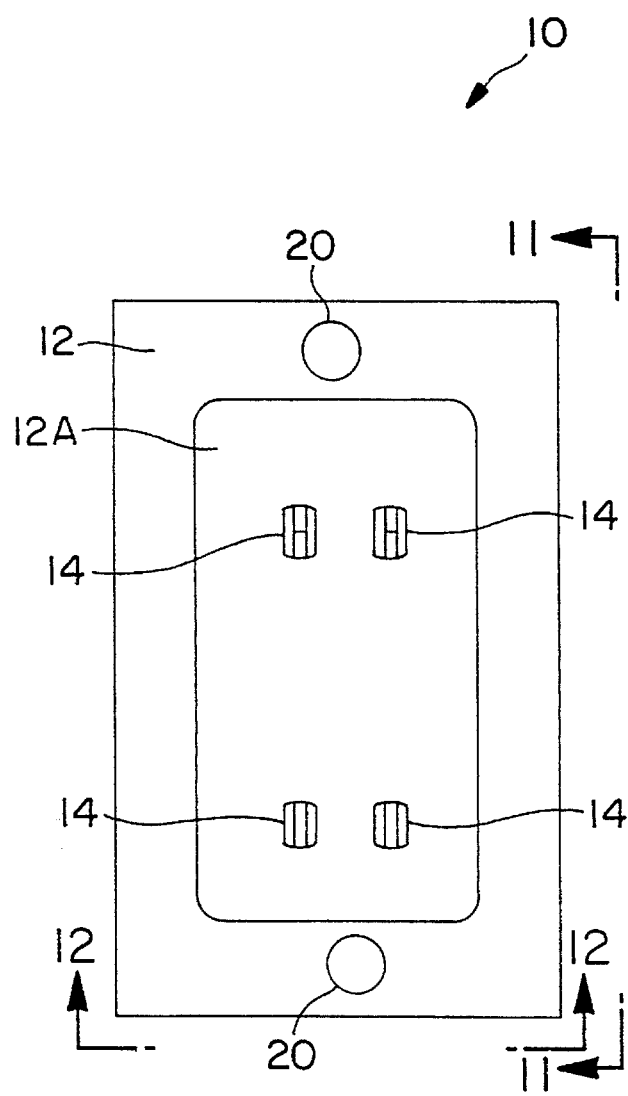
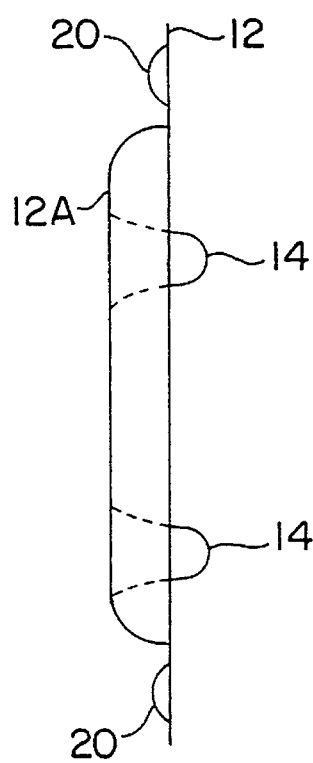
FIG. 10　　　FIG. 11
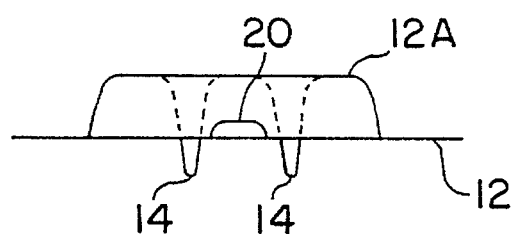
FIG. 12

REMOVABLE COVER FOR PROTECTING ELECTRICAL COMPONENTS DURING PAINTING OR PLASTERING

FIELD OF THE INVENTION

The invention relates to a removable cover for temporary attachment to a wall-mounted electrical component, such as a switch or an outlet, during painting, plastering or similar wall surface finishing process to prevent paint and like materials from impinging on or into the electrical component.

BACKGROUND OF THE INVENTION

The installation of electrical wiring circuits, controls and outlets in the original construction or renovation of an office or dwelling involves numerous steps, some of which are contingent upon the performance and completion of other construction tasks. Specifically, the installation of electrical service in a newly-constructed room typically involves several stages. After the wall framing is erected, the electrician installs the in-wall junction boxes which will house the electrical components (e.g., switches, outlets, lighting fixtures, etc.), and runs the distribution cables from a main power circuit-breaker panel to and through the various electrical boxes in each circuit (e.g., through a switch box to its controlled outlets or light fixture boxes). The next stage is mounting each electrical component into its box and connecting its terminals to the proper wire of the distribution cables, and then attaching a permanent ornamental cover plate over the box and electrical components, leaving the switch post or outlet receptacle exposed for access.

It is often not feasible to complete all of the electrical installation stages during one phase of the room construction. If the electrical components (switches, outlets, etc.) are installed in the wall boxes prior to dry-wall seaming, plastering, painting and/or wallcover hanging, the electrical components have to be masked to prevent paste, plaster, sanding dust or paint from impinging in and on the components. Consequently, wall finish and painting is typically performed after the wires have been strung to the boxes, but prior to the installation and connection of the electrical components. That is, the electricians work is interrupted after the boxes are installed and the wires run thereto, and they must wait for the walls to be finished before returning to complete the wiring of the room.

If an electrician is working on only a few rooms in one building, or if the detailed wiring drawings are correctly updated, later completion of wiring is usually routine. However, if an electrician is involved in numerous projects or the delay in returning is long, it may be difficult for him to recall the wiring layout. It is also not uncommon that changes are made to the electrical layout during construction without the wiring diagrams being properly updated. Since the wires are now covered by the walls, the electrician must then spend a considerable amount of time redetermining the wiring configuration. For example, he may have to redetermine which wires leading to a box are to be controlled by a particular switch.

A need therefore exists for an inexpensive apparatus for protecting an electrical component from the impingement of dust, plaster, paste or paint during room surface finishing, thereby permitting the installation of the electrical components prior to room surface finishing.

SUMMARY OF THE INVENTION

An object of this invention is to provide a temporary cover to protect an electrical component from the impingement of dust, plaster, paste or paint during room surface finishing, thereby permitting the installation of the electrical components prior to room surface finishing, yet being sufficiently inexpensive and easily removable for later replacement by a permanent ornamental cover.

This and other objects of the invention are achieved by a removable cover which shrouds an electrical component from the impingement of dust, plaster, paste or paint during a room surface finishing process. The electrical component, disposed in an electrical junction box mounted within a wall, has apertures formed therein. The removable cover includes a cap member for covering the electrical component and also includes at least one plug member formed on the cap member for coupling the cover to the electrical component. The plug member is configured so as to be securely disposed within an aperture of the electrical component when the removable cover is disposed over the electrical component. In the preferred embodiment of the invention, the plug member is formed integral with and protruding from the cap member and forms a receptacle on the opposite side of the cap member, the receptacle adapted to receive a plug member from a corresponding removable cover thereby facilitating the stacking of the covers.

The foregoing and other objects, features and advantages of the present invention will become more apparent in light of the following detailed description of exemplary embodiments thereof, as illustrated in the accompanying drawings.

DESCRIPTION OF THE DRAWINGS

For the purpose of illustrating the invention, the drawings show a form of the invention which As presently preferred. However, it should be understood that this invention is not limited to the precise arrangements and instrumentalities shown in the drawings.

FIG. 1 is a front plan view of an outlet cover embodiment of the invention.

FIG. 2 is a side view of the embodiment of FIG. 1, from line 2—2 and in the direction indicated by the directional arrows.

FIG. 3 is a section view of the embodiment of FIG. 1, from line 3—3 and viewed in the direction of the directional arrows.

FIG. 4 is a detail view of one of the plug members of the embodiment of FIG. 1.

FIG. 5 is a view of the plug member of FIG. 4, from line 5—5 in the direction indicated by the directional arrows of FIG. 4.

FIG. 6 is a front plan view of a switch cover embodiment of the invention.

FIG. 7 is a side view of the embodiment of FIG. 6, from line 7—7 in the direction indicated by the directional arrows of FIG. 6.

FIG. 8 is a section view of the embodiment of FIG. 6, from line 8—8 in the direction indicated by the directional arrows of FIG. 6.

FIG. 9 is a detail view of one of the plug members shown in FIG. 7.

FIG. 10 is a front plan view of a second outlet cover embodiment of the invention.

FIG. 11 is a side view of the embodiment of FIG. 10, from line 11—11 and in the direction indicated by the directional arrows.

FIG. 12 is a bottom view of the embodiment of FIG. 10, from line 12—12 and viewed in the direction of the directional arrows.

DETAILED DESCRIPTION OF PREFERRED EMBODIMENTS

Figure 13:
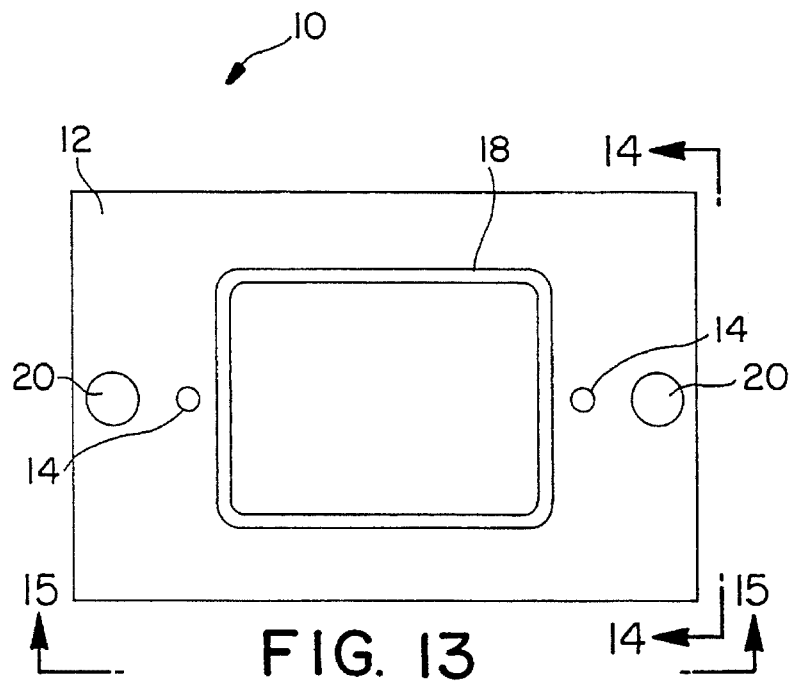
FIG. 13 is a front plan view of a second switch cover embodiment of the invention.

Referring now to the, drawings, wherein like reference numerals illustrate corresponding or similar elements, FIG. 1 illustrates an embodiment of the removable cover 10 for a two-receptacle electrical outlet component. The outlet component is mounted and connected in an electrical junction box mounted within a wall. The cover 10 shrouds the outlet component from the impingement of dust, paste or paint during room and wall surface finishing.

For purposes of brevity, further reference in this description will be to preventing impingement of paint during the wall painting process, it being understood that the same cover will protect against wet plaster and drywall paste, sanding dust, mastic or adhesive in other types of room surface finishing. Furthermore, Disclosure Document No. 320230, filed on Nov. 4, 1992, relates to the present invention and is incorporated herein by reference.

The removable cover 10 is used as a temporary step in the installation of electrical service, and is not intended to be a permanent cover of the electrical component. Instead, the cover 10 is removed after the completion of the painting process and replaced by a permanent ornamental outlet-plate.

The removable cover 10 includes a cap member 12 which is configured to completely shroud or mask the outlet and the edges of the junction box, and is designed to lie with its perimeter substantially flush against the wall when the cover is coupled to the outlet as described below. The cap member 12 of FIG. 1 is shown as a planar rectangular plate. However, since the electrical component often extends past the plane of the wall, the cap member 12 may be formed in a slightly convex shape (its edges curved inward), thereby forming a close seal to the wall surface. While the cap member 12 is depicted as being rectangular in shape, it should be readily understood that other shapes may be chosen without detracting from the invention. As stated above, the shape of the cap member 12 is configured to shroud the outlet and the junction box from paint, and it is preferable to configure the cap member 12 with dimensions which are slightly smaller than the dimensions of the permanent cover plate which will be installed after the painting process. Additionally, while the cap member 12 illustrated in FIG. 1 is designed to cover a dual-receptacle electrical outlet, it should be readily apparent that if more than one outlet or other electrical component is installed in the same or adjacent boxes, the cap member 12 may also be configured so as to extend, in either direction, a sufficient dimension to cover all the electrical components. Alternatively, the covers may be used in multiples to cover any additional components in a large junction box.

Referring back to FIG. 1, the removable cover 10 has at least one plug member 14 formed on and extending from the cap member 12, and shaped to conform to an aperture in the electrical component. The plug member 14 functions as a means for coupling the removable cover 10 to the electrical component when it is inserted into the aperture. The tight fit of the plug member 14 within the aperture prevents the removable cover 10 from being inadvertently dislodged during the painting process. The shape, number, and spacing of the plug members 14 will vary depending on the type of electrical component that is installed.

In the embodiment depicted in FIGS. 1 through 4, the removable cover 10 is configured for use with a dual-receptacle electrical outlet. The cap member 12 is rectangular in shape and configured with dimensions slightly smaller than the permanent outlet cover. Each plug member 14 is formed with a prong shape which will effectively engage a receptacle socket of the outlet, and the plug members are spaced and aligned such that one plug is inserted in each socket, to retain the removable cover 10 on the electrical outlet. For example, for use on standard United States 110 volt wall outlets, each plug member 14 preferably has a height dimension of approximately 0.38 inches, a width dimension which tapers from approximately 0.25 inches to approximately 0.19 inches, and a thickness dimension which tapers from approximately 0.11 inches to approximately 0.06 inches. These dimensions provide sufficient ease of insertion and retention of the cover. Four plug members 14 are positioned on the cap member 12 in a proper configuration for engaging with the corresponding four sockets when the removable cover 10 is disposed over the electrical outlet.

In the preferred construction, each plug member 14 is formed integrally with the cap member 12 by a molding or a vacuum forming process. By utilizing such processes, it is possible to form the plug member 14 as a hollow prong open at the opposite side of the cover, thus making a hollow receptacle 16 on that side. The receptacle 16 can receive a plug member 14 of a corresponding removable cover 10, thereby permitting the stacking of multiple removable covers 10 upon one another to facilitate packaging and storage.

A second embodiment of the invention, shown in FIGS. 6 through 9, illustrates the use of a removable cover 10 with an electrical switch (not shown). In this embodiment, the cap member 12 has at least one chamber 18 formed thereon for encasing a portion of the switch. For instance, when a toggle-type or a push-button electrical light switch is installed in a wall, the post of the switch protrudes from the plane of the wall. In order to shroud the electrical component, the cap member 12 is formed with a chamber 18 having sufficient dimensions to properly enclose the protruding post portion of the switch. The chamber 18 is, preferably, formed integral with the cap member 12 and protrudes from the cap member 12 in a direction which is opposite to the direction of protrusion of the plug member 14.

The plug member 14 of the second embodiment is conical in shape for engaging with a corresponding aperture (here a cover screw aperture) on a light switch. It is preferable to use two plug members 14, as shown in FIG. 6, positioned sufficiently apart so as to engage with the two corresponding cover screw apertures in the switch. In this embodiment, the height dimension of the plug member 14 is approximately 0.1875 inches and the diameter of the conical plug member 14 tapers from approximately 0.125 inches to approximately 0.08 inches.

Although the two embodiments have been illustrated as separate and distinct, the two embodiments may be combined into a single removable cover. For example, if an outlet and switch are located adjacent to one another, a single removable cover may be formed with plug members 14 and chambers 18 as required. In any event, the cover plates may be used in multiples of the same or in combinations of each.

In both embodiments detailed above, the removable cover 10 is preferably fabricated from a thermoplastic material, such as polyvinyl chloride (PVC), which provides good dielectric characteristics, yet is relatively inexpensive. Other thermoplastic materials such as polyethylene and polystyrene may also be used. A thickness of ten to twelve mils of PVC will provide sufficient stiffness for a minimal cost, although it should be noted that if different material is chosen or if cost is not a factor, then the thickness may vary significantly. Those skilled in the art can readily appreciate that other materials, thicknesses, and processes may be utilized without detracting from the invention.

A bright coating may be disposed on at least a portion of the removable cover 10 to provide an easy means of identifying the cover 10 when it is installed on a wall. Alternately, the coating may be configured so as to reduce the wall paint adhesion to the cover 10.

Referring now to FIGS. 10, 11 and 12, a second and, presently, preferred, outlet cover embodiment of the invention is illustrated. The cover 10 includes a cap 12 and plug members 14. The cap 12 has a raised portion 12$_A$ which projects outward from the cap 12. The raised portion 12$_A$ assists in maintaining a close seal with the wall by accommodating situations wherein the electrical sockets extend past the plane of the wall. Additionally, screw domes 20 may be incorporated for accommodating the projection of screw heads which are utilized to hold the electrical component to the wall. In the embodiment illustrated in FIGS. 10–12, the raised portion 12$_A$ is approximately 5/16ths of an inch above the cap 12. The plug members 14 have a height dimension of about a ½ inch. The screw domes 20 are circular in shape with a 5/16th inch diameter and project about an ⅛th of an inch frown the cap 12.

Figure 14:
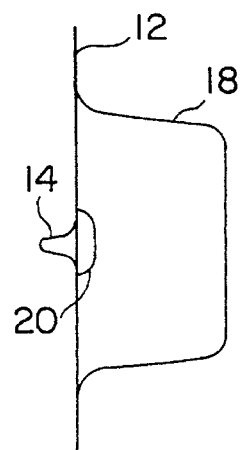
FIG. 14 is a side view of the second switch cover embodiment of FIG. 13, from line 14—14 in the direction indicated by the directional arrows of FIG. 13.
Figure 15:
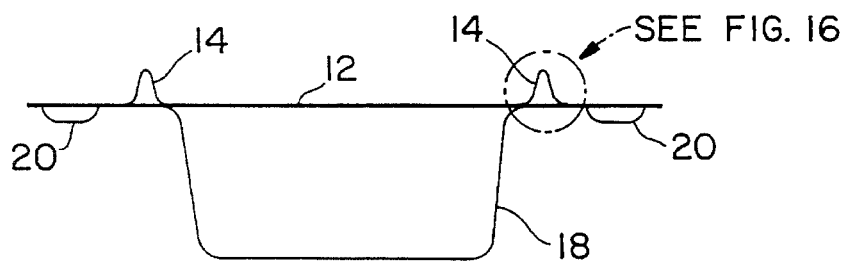
FIG. 15 is a bottom view of the embodiment of FIG. 13, from line 15—15 in the direction indicated by the directional arrows of FIG. 13.
Figure 16:
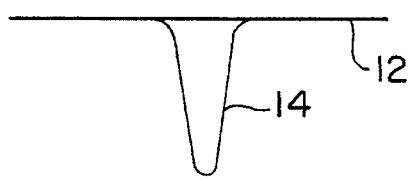
FIG. 16 is a detail view of one of the plug members shown in FIG. 15.

FIGS. 13, 14, 15 and 16 illustrate an alternate and, presently, more preferred embodiment of the switch cover. The cover 10 of this embodiment includes a cap 12, plug members 14 and chamber 18. The cap 12 includes screw domes 20 which function to enclose the screw heads which attach the switch to the wall.

As discussed hereinabove, the ability of a plug member 14 of one removable cover 10 to be received by a receptacle 16 of another removable cover 10 permits multiple removable covers 10 to be stacked upon one another. Consequently, it is possible to package a plurality of removable covers 10 within a container for storage or sale as a kit. The stackability of the removable covers 10 minimizes the volume that the removable covers will occupy, thereby permitting the use of a smaller container than would otherwise be required.

Furthermore, while the invention has been disclosed as useful during the construction of a home or other building, it should be readily appreciable that the invention may also be used during renovation of a room, such as when a room is being repainted.

Although the invention has been described and illustrated with respect to the exemplary embodiments thereof, it should be understood by those skilled in the art that the foregoing and various other changes, omissions and additions may be made therein and thereto, without departing from the spirit and scope of the present invention.

What is claimed is:

1. A removable cover for shrouding an electrical component during a room surface finishing process, the electrical component being disposed in an electrical junction box mounted within a wall and the component having apertures formed therein, wherein the removable cover comprises:

a cap member for covering the electrical component when the removable cover is disposed over the electrical component; and at least one plug member formed on said cap member for coupling said cap member to the electrical component, said at least one plug member being securely disposed within one of the apertures of the electrical component when said removable cover is disposed over the electrical component, wherein said at least one plug member is integral with and protrudes from one side of said cap member, and forms a receptacle on an opposite side of said cap member, said receptacle adapted to receive a plug member of a corresponding removable cover.

2. The removable cover of claim 1 wherein there are four plug members, said plug members being positioned for engaging with the sockets of a dual-receptacle outlet, said plug members having at least one tapered dimension.

3. The removable cover of claim 1 wherein said cap member is substantially planar in shape.

4. The removable cover of claim 1 wherein the edges of the cap member are curved slightly in the same direction as the direction of protrusion of said at least one plug member.

5. The removable cover of claim 1 wherein said cap member has a chamber formed thereon for enclosing a portion of the electrical component, said chamber being formed integral with said cap member and protruding from said cap member in a direction which is opposite to the direction of protrusion of said at least one plug member.

6. The removable cover of claim 5 wherein there are two plug members, said plug members being substantially conical in shape, and said plug members being disposed on opposite sides of said chamber.

7. The removable cover of claim 1 wherein said cap member and said at least one plug member are made from a thermoplastic material.

8. The removable cover of claim 7 wherein said thermoplastic material is chosen from the group consisting of polyvinyl chloride, polyethylene, and polystyrene, having a thickness in a range between ten and twelve mils.

9. The removable cover of claim 1 further comprising a coating disposed on at least a portion of said cap member.

10. The removable cover of claim 1 wherein said cap member has a raised portion which projects in a direction opposite to the protrusion of said at least one plug member.

11. The removable cover of claim 1 further comprising at least one screw dome formed on said cap member for covering the head of a screw which is used to attach the electrical component to the wall.

12. A kit comprising:

a plurality of removable covers for shrouding electrical components during a room surface finishing process, each electrical component being disposed in an electrical junction box mounted within a wall and the component having apertures formed therein;

wherein each removable cover includes a cap member for covering an electrical component when the removable cover is disposed over the electrical component, and at least one plug member formed on said cap member for coupling said cap member to the electrical component, said at least one plug member being securely disposed within an aperture of the electrical component when said removable cover is disposed over the electrical component, said at least one plug member furthermore being integral with and protrudes from one side of said cap member, and forms a receptacle on an opposite side of said cap member, said receptacle adapted to receive a plug member of a corresponding removable cover;

each removable cover being stacked against an adjacent removable cover by the mating of plug members to receptacles; and a container configured to envelop said stacked plurality of covers.

13. The kit of claim 12 wherein each removable cover has four plug members, said plug members being positioned for engaging with the sockets of a dual-receptacle outlet, said plug members having at least one tapered dimension, and wherein said cap member is substantially planar in shape.

14. The kit of claim 12 wherein each cap member has a chamber formed thereon for enclosing a portion of the electrical component, said chamber being formed integral with said cap member and protruding from said cap member in a direction which is opposite to the direction of protrusion of said at least one plug member.

15. The kit of claim 14 wherein each removable cover has two plug members, said plug members being substantially conical in shape, and said plug members being disposed on opposite sides of said chamber.

16. The kit of claim 12 wherein each cap member and said at least one plug member are made from a thermoplastic material.

17. The kit of claim 16 wherein said thermoplastic material is chosen from the group consisting of polyvinyl chloride, polyethylene, and polystyrene, having a thickness in a range between ten and twelve mils.

* * * * *